: US 11,042,763 B2
Jun. 22, 2021

(54) METHOD, DEVICE AND SENSOR SYSTEM FOR MONITORING THE SURROUNDINGS FOR A VEHICLE

(71) Applicant: Robert Bosch GmbH, Stuttgart (DE)

(72) Inventor: Hans-Leo Ross, Lorsch (DE)

(73) Assignee: Robert Bosch GmbH, Stuttgart (DE)

( * ) Notice: Subject to any disclaimer, the term of this patent is extended or adjusted under 35 U.S.C. 154(b) by 94 days.

(21) Appl. No.: 16/577,411

(22) Filed: Sep. 20, 2019

(65) Prior Publication Data

US 2020/0104611 A1    Apr. 2, 2020

(30) Foreign Application Priority Data

Sep. 28, 2018    (DE) .......................... 102018216809.1

(51) Int. Cl.
*G06K 9/00*    (2006.01)
*G06K 9/62*    (2006.01)

(52) U.S. Cl.
CPC ....... *G06K 9/00805* (2013.01); *G06K 9/6267* (2013.01); *G06K 9/6288* (2013.01)

(58) Field of Classification Search
None
See application file for complete search history.

(56) References Cited

U.S. PATENT DOCUMENTS 7,065,432 B2 * 6/2006 Moisei ...................... B60R 1/00
701/1
10,417,507 B2 * 9/2019 Dojcinovic ............. G06T 7/254
(Continued)

FOREIGN PATENT DOCUMENTS

DE    10133945 A1    2/2003
EP    2902261    *    8/2015

OTHER PUBLICATIONS

Lim, Teck-Yian, et al. "Radar and camera early fusion for vehicle detection in advanced driver assistance systems." Machine Learning for Autonomous Driving Workshop at the 33rd Conference on Neural Information Processing Systems. 2019. (Year: 2019).*

(Continued)

*Primary Examiner* — Andrae S Allison
(74) *Attorney, Agent, or Firm* — Norton Rose Fulbright US LLP; Gerard Messina

(57) ABSTRACT

A method for monitoring vehicle surroundings, including: reading in first and second surrounding-area information-items respectively with first and second detectors. The first and second surrounding-area information-items represent information items receivable from the vehicle surroundings and is about at least one object in the surroundings; processing the first surrounding-area information-item with the first detector, to provide first sensor-data, and processing the second surrounding-area information-item with the second detector, to provide second sensor-data; merging the first sensor-data and the second sensor-data, using a time-difference information item, to provide a measuring-signal. The time-difference information item represents a time-difference between a first latency-time, which is needed by the first detector for the processing, up to the provision of the first sensor-data, and a second latency-time, which is needed by the second detector for the processing, up to the provision of the second sensor-data. The measuring signal represents monitored surroundings of the vehicle.

15 Claims, 3 Drawing Sheets

(56) References Cited

U.S. PATENT DOCUMENTS

| | | | | |
|---|---|---|---|---|
| 2003/0014680 | A1* | 1/2003 | Zielbauer | H04J 3/0682 713/400 |
| 2004/0267943 | A1* | 12/2004 | Ryu | G06Q 30/02 709/228 |
| 2005/0021201 | A1* | 1/2005 | Klotz | G01S 13/86 702/189 |
| 2006/0038895 | A1* | 2/2006 | Suzuki | H04N 7/181 348/222.1 |
| 2008/0007568 | A1* | 1/2008 | Chou | G06T 19/00 345/629 |
| 2012/0319888 | A1* | 12/2012 | Suzuki | G01S 13/345 342/107 |
| 2014/0063254 | A1* | 3/2014 | Shi | G06T 7/80 348/148 |
| 2014/0109096 | A1* | 4/2014 | Chandhoke | G06F 1/12 718/102 |
| 2014/0333729 | A1* | 11/2014 | Pflug | G06T 15/20 348/47 |
| 2020/0234582 | A1* | 7/2020 | Mintz | G07B 15/063 |
| 2020/0283028 | A1* | 9/2020 | Oba | B60W 60/0057 |

OTHER PUBLICATIONS

Zhang, Buyue, et al. "A surround view camera solution for embedded systems." Proceedings of the IEEE conference on computer vision and pattern recognition workshops. 2014. (Year: 2014).*

Yebes, J. Javier, et al. "Surrounding view for enhancing safety on vehicles." Proceedings of Workshop Perception in Robotics, as part of the IEEE Intelligent Vehicles Symposium. 2012. (Year: 2012).*

Yeh, Yen-Ting, Chun-Kang Peng, Kuan-Wen Chen, Yong-Sheng Chen, and Yi-Ping Hung. "Driver assistance system providing an intuitive perspective view of vehicle surrounding." In Asian Conference on Computer Vision, pp. 403-417. Springer, Cham, 2014. (Year: 2014).*

* cited by examiner

METHOD, DEVICE AND SENSOR SYSTEM FOR MONITORING THE SURROUNDINGS FOR A VEHICLE

RELATED APPLICATION INFORMATION

The present application claims priority to and the benefit of German patent application no. DE 10 2018 216 809.1, which was filed in Germany on Sep. 28, 2018, the disclosure of which is incorporated herein by reference.

FIELD OF THE INVENTION

The present invention is based on a device or a method according to the definition of the species in the independent claims. A computer program also constitutes the subject matter of the present invention.

BACKGROUND INFORMATION

In vehicles, several sensors may be used for monitoring the surroundings. In this connection, it may be necessary to merge sensor data of a plurality of sensors, in particular, for object detection.

SUMMARY OF THE INVENTION

Against this background, using the approach introduced here, a method, in addition, a device which utilizes this method, a system and, finally, a corresponding computer program, according to the main claims, are put forward. Advantageous further refinements and improvements of the device indicated in the independent claim are rendered possible by the measures specified in the dependent claims.

According to specific embodiments, latency times of a plurality of participating sensors may be taken into account, in particular, in the case of sensor data fusion; the latency times being sensor-specific or, in other words, specific to a respective, participating, physical and electrical part of the detector. For example, the latency times may be ascertained continuously during sensor operation. In this context, the latency times may include, in particular, signal propagation times and overall times of signal processing.

According to specific embodiments, in particular, exact real-time monitoring of surrounding-area data may be rendered possible in an advantageous manner. In this connection, for example, reliable synchronization to a system time may be achieved. Even in the case of a combination of different physical, measurement-dependent tolerances and propagation times, effects of environmental conditions, signal conversion, error control, data interpretation, etc., which may be heterogeneous in general and difficult to measure in particular, data may be provided, for example, rigorously and/or accurately, deterministically and also synchronizably and/or accurately timed with regard to a reference time. In particular, for time-sensitive safety applications, synchronized data may be made available, in order that they may also be acquired in a comprehensible and verifiable manner. In the case of sensor data fusion between two different measuring principles, for example, a lack of sharpness, which is based on the addition of tolerances, may be reliably prevented. In addition, a lack of sharpness may be prevented from increasing on the basis of time and possible degrees of freedom. Therefore, for example, subjects, such as timely functioning, fault-tolerant systems, solid performance characteristics and systems, which may also ensure required functionality in the case of a fault, may be addressed in a comprehensive safety plan. In this connection, in particular, information items available through data technology may be rendered comparable with regard to their actually real, effective occurrence, and an age of an information item in the system may be known within a defined time window or real-time window.

A method for monitoring the surroundings for a vehicle is put forward, the method including the following steps:

reading in a first surrounding-area information item with the aid of a first detector and a second surrounding-area information item with the aid of a second detector; the first surrounding-area information item and the second surrounding-area information item representing an information item, which is receivable from the surroundings of the vehicle and is about at least one object in the surroundings;

carrying out processing of the first surrounding-area information item with the aid of the first detector, in order to provide first sensor data, and carrying out processing of the second surrounding-area information item with the aid of the second detector, in order to provide second sensor data; and merging the first sensor data and the second sensor data, using a time-difference information item, in order to provide a measuring signal; the time-difference information item representing a time difference between a first latency time, which is needed by the first detector for the processing, up to the provision of the first sensor data, and a second latency time, which is needed by the second detector for the processing, up to the provision of the second sensor data; the measuring signal representing monitored surroundings of the vehicle.

This method may be implemented, for example, as software or hardware or as a mixture of software and hardware, in, for example, a control unit. In the method, time data from infrastructure, such as time stamps of a tracking device, satellite data or other physical effects, which include time information, may be considered. Such time data may contribute to the setting-up of a temporally correct inertial system.

A detector may be configured to monitor the surroundings, using electromagnetic or acoustic waves reflected by an object. Thus, a surrounding-area information item may be an electromagnetic or acoustic signal. A surrounding-area information item may represent at least one physically measurable characteristic of the at least one object in the surroundings. A detector may be, for example, a camera, an ultrasonic sensor or a radar sensor. The two detectors may be identical or different. The detectors may also use different physical variables for monitoring the surroundings. The information item receivable from the surroundings of the vehicle may be a representation of the object. In the step of processing the surrounding-area data, for example, object detection, distance measurement or the like may be carried out. Thus, the sensor data may include data regarding the object, which may be used, for example, by a driving assistance system of the vehicle. The measuring signal may include merged data from the first and second sensor data. In this context, using the time-difference information item, it may be ensured that temporally matching sensor data are merged with each other. A latency time, which is needed by a detector for the processing, up to the provision of sensor data, may represent a period of time between an instant of obtaining a surrounding-area information item, up to an instant of providing sensor data; the period of time being specific to the detector in question and, additionally or alternatively, being ascertained continuously. In the fusion step, sensor data fusion of the sensor data may be carried out, using a fusion model, a maturity model or the like.

According to one specific embodiment, the method may include a step of ascertaining the time-difference information item. In this connection, in the ascertaining step, signal propagation times, times for physical-to-electrical conversion, and times for signal processing may be combined to obtain the first latency time with regard to the first detector and the second latency time with regard to the second detector. The step of ascertaining may be executed continuously, for example, during a trip of the vehicle or during the execution of the other steps of the method. An advantage of such a specific embodiment is that an exact and current latency time may be provided for each detector, which means that a reliable time-difference information item is available for the sensor data fusion, in order to render real-time monitoring possible.

In the fusion step, the first sensor data and, additionally or alternatively, the second sensor data may also be scaled, using the time-difference information item. In addition, or as an alternative, in this connection, the first sensor data and the second sensor data may be synchronized, using the time-difference information item and a model for sensor data fusion. The model for sensor data fusion may represent a maturity model or another model. Such a specific embodiment provides the advantage that streams of sensor data may be allowed to flow from the detectors.

In addition, a neural network, a classification method, a stochastic method, a Kalman filter, fuzzy logic and, additionally or alternatively, logic operations, may be used in the fusion step. Such a specific embodiment provides the advantage that the sensor data fusion may be carried out in a reliable, rapid and exact manner.

In addition, in the step of carrying out the processing, the first sensor data may be provided with a first time information item, and the second sensor data may be provided with a second time information item. In this connection, in the fusion step, the first sensor data and the second sensor data may be merged, using the first time information item and the second time information item. The time information item may represent a time equivalent; the time equivalent being able to represent a time stamp and, additionally or alternatively, a message counter, communication counter, or the like. An advantage of such a specific embodiment is that a time equivalent suitable as a function of the application and suited to exact synchronization may be applied to the sensor data.

According to one specific embodiment, the method may include a step of emitting a first sensing signal with the aid of the first detector and, additionally or alternatively, emitting a second sensing signal with the aid of the second detector, into the surroundings of the vehicle. In this connection, the first surrounding-area information item may be receivable in response to the first sensing signal. In addition, or as an alternative, the second surrounding-area information item may be receivable from the surroundings of the vehicle in response to the second sensing signal. In this connection, the first detector may have, for example, a principle of detection based on lidar or radar. Additionally or alternatively, the second detector may have, for example, a principle of detection based on lidar or radar. The first sensing signal and, additionally or alternatively, the second sensing signal may include electromagnetic waves. Such a specific embodiment provides the advantage that a representation of the surroundings of the vehicle may be obtained in a rapid and accurate manner. A signal propagation time may be calculated from the frequency of emitted and reflected light; acquisition with the aid of lidar being very rapid, and the acquisition of light at a high frequency, with wavelengths in the nanometer range, also being more rapid than in the case of lower frequencies, with wavelengths in the micrometer range.

In the step of carrying out the processing, the first sensor data and the second sensor data may also be provided with an integrity information item. In this connection, the integrity information item may be checked in the fusion step. The integrity information item may represent encryption of the sensor data, a signature attached to the sensor data, or the like. An advantage of such a specific embodiment is that incorrect or corrupted data may be rejected or, in the case of highly available systems, may be denoted data-technology-specifically by signal qualifiers as having less integrity. This may be useful, in particular, when unsharp logic, such as fuzzy logic or neural networks, is used, or when many sources are used for checking plausibility, which means that a signal availability may be increased. In addition to the integrity information item, a time information item may be used, in order to check a timeliness of the sensor data. A correctness or integrity of the data source, that is, the system is free of defects and/or is operated in a nominal range of application, an integrity and timeliness of the information, may be provided as a quality criterion for further processing. Alternatively, in a further processing step, for example, activation of an actuator may be evaluated in a comparable manner. As an alternative to checking at the input of the processing unit, the information may be used in order to analyze logical processing, before it is switched to the actuator. This has the advantage that when they are correct, timely, etc., the data are allowed through to the actuator, but the nominal data stream is not held up, before the previous data stream, e.g., input data, have been checked.

In addition, in the reading-in step, a further surrounding-area information item may be read in with the aid of a further detector. The further surrounding-area information item may represent an information item, which is receivable from the surroundings of the vehicle and is about at least one object in the surroundings. In this context, in the execution step, processing of the further surrounding-area information item may be carried out with the aid of the further detector, in order to provide further sensor data. In this connection, in the fusion step, the further sensor data may be merged with the first sensor data and, additionally or alternatively, with the second sensor data, using the time-difference information item. The time-difference information item may represent a time difference between the first latency time, the second latency time and, additionally or alternatively, a further latency time, which is needed by the further detector for the processing, up to the provision of the further sensor data. Such a specific embodiment provides the advantage, that a plurality of detectors may be, or may become involved in the monitoring of the surrounding area, in order to allow accurate and reliable monitoring of the surrounding area.

In addition, in the reading-in step, the first surrounding-area information item may be used for data information. Upon receipt of the second surrounding-area information item or a further surrounding-area information item, in the negative case, the first surrounding-area information item may be disqualified from further processing, before the same is transmitted to an actuator. Consequently, a diagnostic information item or correction information item may overtake a nominal data stream and/or processing of useful payload data.

Thus, the method may include a step of checking a consistency of the first surrounding-area information item and the second surrounding-area information item. In a routing step, the measuring signal or the first surrounding-area information item may be passed on, if there is consistency between the first surrounding-area information item and the second surrounding-area information item. In a blocking step, the measuring signal or the first surrounding-area information item may be blocked, if there is no consistency between the first surrounding-area information item and the second surrounding-area information item. Consistency may be present, if the two surrounding-area information items may be assigned to the same type of object. Consistency may not be present, if the two surrounding-area information items may be assigned to different types of objects. In this context, it is advantageous that a correctness information item relating to the consistency may be communicated through the systems more rapidly than the payload data undergoing processing. Consequently, it is possible to overtake the processing of payload data. This may also be combined highly effectively with an approach, in which there is two-way monitoring of redundant control units, via which a communication is exchanged. Here, this mechanism has the advantage that the diagnostic information may render the two-way monitoring more effective, owing to the more rapid communication.

The approach put forward here also provides a device, which is configured to perform, control and/or implement, in corresponding devices, the steps of a variant of a method put forward here. The objective of the present invention may be achieved quickly and efficiently by this embodiment variant of the invention in the form of a device, as well.

To this end, the device may include at least one processing unit for processing signals or data, at least one storage unit for storing signals or data, at least one interface to a sensor or an actuator for reading in sensor signals from the sensor or for outputting data signals or control signals to the actuator, and/or at least one communications interface for reading in or outputting data, which are embedded in a communications protocol. The processing unit may be, for example, a signal processor, a microcontroller or the like; the storage unit being able to be a RAM, DRAM, etc., or a flash memory, an EEPROM or a magnetic storage unit. The communications interface may be configured to read in or output data wirelessly and/or in a line-conducted manner; a communications interface, which is able to read in or output the line-conducted data, being able to read in these data, e.g., electrically or optically, from a corresponding data transmission line or to output them to a corresponding data transmission line.

In the case at hand, a device may be understood to be an electrical device, which processes sensor signals and outputs control and/or data signals as a function of them. The device may include an interface, which may take the form of hardware and/or software. In a hardware configuration, the interfaces may, for example, be part of a so-called system ASIC, which includes various functions of the device. However, it is also possible for the interfaces to be separate, integrated circuits or to be at least partially made up of discrete components. In a software configuration, the interfaces may be software modules that are present, for example, in a microcontroller, next to other software modules.

In one advantageous refinement, the device monitors the surroundings for a vehicle and provides a measuring signal, which represents the monitored surroundings. The device may be configured to provide the measuring signal to at least one assistance system of the vehicle. To this end, the device may access, for example, sensor signals, such as sensor data of the detectors, and signals of other vehicle sensors, such as a speed sensor, a position sensor, a temperature sensor and the like. In the case of use by at least one assistance system of the vehicle, the measuring signal may be suitable for effecting activation, parameterization, or the like of the assistance system.

A sensor system for monitoring the surroundings for a vehicle is also put forward, the sensor system including the following features:
a first detector;
a second detector; and
a specific embodiment of the device mentioned above; the device being connected to the first detector and to the second detector so as to be able to transmit a signal.

In conjunction with the sensor system, a specific embodiment of the above-mentioned device may be employed or utilized advantageously to control and/or execute the monitoring of the surroundings. The device may include a plurality of mechanisms, which may be situated in at least one unit of the sensor system. According to one specific embodiment, the units of the sensor system include the first detector, the second detector, optionally, at least one further detector, and a data management device.

According to one specific embodiment, the first detector and the second detector may have an identical or a different detection principle. Such a specific embodiment provides the advantage that mutual plausibility-checking and, additionally or alternatively, supplementation and concretization of acquired data are rendered possible.

In particular, the first detector may have a detection principle based on lidar. In this connection, the second detector may have a detection principle based on radar or may be implemented as a vehicle camera. Such a specific embodiment provides the advantage that on one hand, rapid and exact scanning of the surroundings may be achieved, which may be available for pre-parameterization of an assistance system, and, on the other hand, for checking the plausibility of, and concretizing this scanning, in order to achieve accurate and reliable monitoring of the surroundings.

The sensor system may also have a further detector. The further detector may be connected to the device so as to be able to transmit a signal. The further detector may have a detection principle identical to or different from the first detector and, additionally or alternatively, the second detector. Such a specific embodiment provides the advantage that a plurality of detectors may be considered and/or used in the monitoring of the surroundings, in order to further increase an accuracy and reliability of the monitoring of the surroundings.

A computer program product or computer program including program code, which may be stored in a machine-readable carrier or storage medium, such as a solid state memory, a hard disk storage device or an optical storage device and is used for performing, implementing and/or controlling the steps of the method according to one of the above-described specific embodiments, in particular, when the program product or program is executed on a computer or a device, is also advantageous. Therefore, such a storage device is also claimed. A device, which is configured to execute one of the above-mentioned methods, is claimed, as well.

Exemplary embodiments of the approach put forward here are illustrated in the drawings and explained in greater detail in the following description.

In the following description of the exemplary embodiments of the present invention, the same or similar reference numerals are used for the elements that are shown in the different figures and function similarly, in which case a repeated description of these elements is omitted.

DETAILED DESCRIPTION

Figure 1:
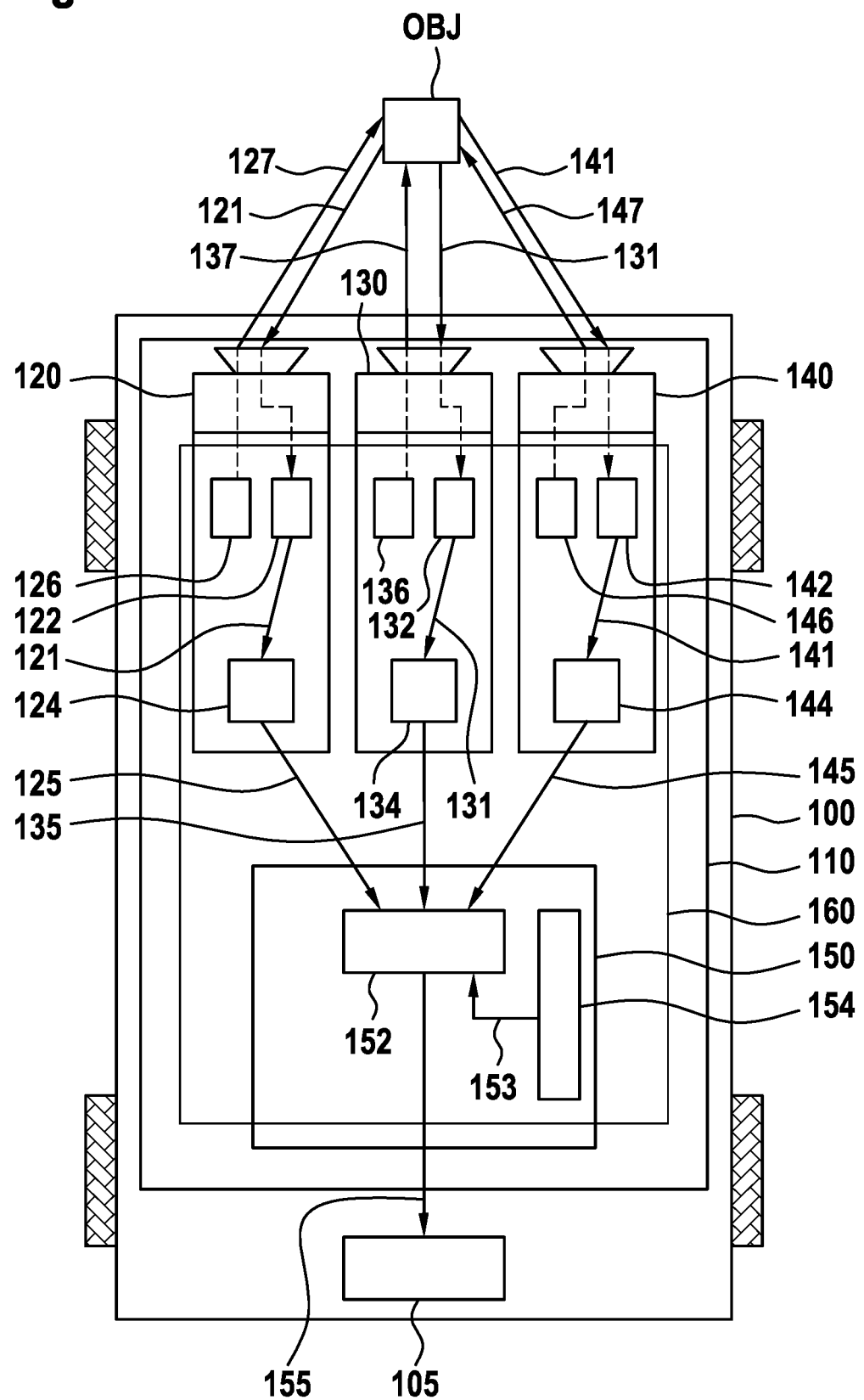
FIG. 1 shows a schematic representation of a vehicle having a sensor system according to an exemplary embodiment.

FIG. 1 shows a schematic representation of a vehicle 100 having a sensor system 110 according to an exemplary embodiment. According to the exemplary embodiment depicted here, vehicle 100 is a road vehicle, for example, a passenger car, a cargo truck or another commercial vehicle, in particular, a vehicle for highly automated traveling. By way of example, only an assistance system 105 and sensor system 110 of vehicle 100 are shown. Assistance system 105 is configured to control or execute an assistance function and/or driving function of vehicle 100. Sensor system 110 is configured to carry out monitoring of the surroundings for vehicle 100. Vehicle 100 is situated inside of a surrounding area. An object OBJ is located in the surroundings of vehicle 100.

In vehicles such as the vehicle 100 shown, optical, but also reflection-based systems, such as radar sensors, lidar sensors, ultrasonic sensors and camera systems, should be able to detect movements of objects and other dynamic effects, such as discontinuous road markings, events suddenly occurring, such as a load falling from a vehicle traveling ahead, but also randomly occurring faults in the system, within a defined period of time. In particular, the utilized measuring principles of surround sensors, but also algorithms, which generate signals for electronic data processing from physical and/or electrical data, should be synchronized to a system time.

Due to different transit times of a measuring medium, there are first temporal inaccuracies in real-time data acquisition, which may be prevented in accordance with exemplary embodiments. In the case of lidar and cameras, light is used as a measuring medium. In accordance with measuring system technology, the camera measures a quantity of incident light, light intensity, etc. A measurement takes place with the aid of a so-called imager of the camera. In the case of lidar, a quantity of reflected light of an emitted laser pulse is measured. In this connection, detection may take place very rapidly with the aid of physical-to-electrical conversion, e.g., comparable to the principle of a photodiode. Using the delay time, different characteristics may then be detected in combination with scattering effects. This may take place in a manner similar to Raman lidar systems or differential absorption lidar. Radar and ultrasonics are based on the measurement of an emitted measuring medium and its reflection, as well. In the case of the camera, if only the simple path from the object to the measuring unit is relevant, then, in the case of lidar, it is twice the distance that the light covers from the emitter to the object, and back to the receiver. Since this takes place approximately at the speed of light, tolerances occurring in the measuring system, and also the physical transit time of the light beam in the actual surrounding area, are very low. In the case of ultrasonics and in the case of radar, the transit times are longer, and, in particular, tolerances in the physical signal propagation time, and a time for physical-to-electrical conversion of the information, are subjected to tolerances due to environmentally dependent effects.

In measuring systems, measures for signal filtering, error correction and error control, signal conversion, and algorithms for determining characteristics, are temporally highly variable and dependent on environmental parameters, such as temperature, vibrations, stresses, electromagnetic compatibility, etc. In the case of physical-to-electrical conversion, a time stamp is normally applied to the electrical data, in order to render such data delay times technically measurable and evaluable.

The sensor system 110 shown includes a first detector 120, a second detector 130 and a device 160 for monitoring the surroundings. According to the exemplary embodiment represented here, sensor system 110 optionally includes a further or third detector 140, as well. Device 160 is connected to detectors 120, 130, 140 so as to be able to transmit a signal. According to the exemplary embodiment represented here, sensor system 110 further includes a data management device 150 in the form of a so-called deadline monitor or the like. In this context, data management device 150 is connected to detectors 120, 130, 140 so as to be able to transmit a signal.

According to different exemplary embodiments, detectors 120, 130, 140 have identical detection principles or at least partially different detection principles. According to the exemplary embodiment represented here, detectors 120, 130, 140 have different detection principles. In particular, first detector 120 has a detection principle based on lidar. Second detector 130 has, for example, a detection principle based on radar. Third detector 140 is constructed, for example, as a vehicle camera or has a detection principle based on radar, as well.

First detector 120 is assigned a first reading-in device 122 and a first execution device 124 or first processing device 124. First reading-in device 122 is configured to read in a first surrounding-area information item 121 with the aid of first detector 120. First surrounding-area information item 121 represents an information item, which is receivable from the surroundings of vehicle 100 and is about object OBJ in the surroundings of vehicle 100. In addition, first reading-in device 122 is configured to pass on read-in, surrounding-area information item 121 to first execution device 124 or to prepare it for output. First execution device 124 is configured to carry out processing of first surrounding-area information item 121 with the aid of first detector 120, in order to provide sensor data 125. According to the exemplary embodiment represented here, first detector 120 is further assigned a first emitting device 126. First emitting device 126 is configured to emit a first sensing signal 127 into the surroundings of vehicle 100 with the aid of first detector 120. In response to first sensing signal 127, first surrounding-area information item 121 is receivable from the surroundings of vehicle 100, that is, from object OBJ. First sensing signal 127 is, for example, a light signal, in particular, a laser signal or lidar signal. Thus, first surrounding-area information item 121 is a reflected light signal.

Second detector 130 is assigned a second reading-in device 132 and a second execution device 134 or second processing device 134. Second reading-in device 132 is configured to read in a second surrounding-area information item 131 with the aid of second detector 130. Second surrounding-area information item 131 represents an information item, which is receivable from the surroundings of vehicle 100 and is about object OBJ in the surroundings of vehicle 100. In addition, second reading-in device 132 is configured to pass on read-in, surrounding-area information item 131 to second execution device 134 or to prepare it for output. Second execution device 134 is configured to carry out processing of second surrounding-area information item 131 with the aid of second detector 130, in order to provide second sensor data 135. According to the exemplary embodiment represented here, second detector 130 is further assigned a second emitting device 136. Second emitting device 136 is configured to emit a second sensing signal 137 into the surroundings of vehicle 100 with the aid of second detector 130. In response to second sensing signal 137, second surrounding-area information item 131 is receivable from the surroundings of vehicle 100, that is, from object OBJ. Second sensing signal 137 is, for example, a radio signal, in particular, a radar signal. Thus, second surrounding-area information item 131 is a reflected radar signal.

The third detector 140 provided in accordance with the exemplary embodiment represented here is assigned a third reading-in device 142 and a third execution device 144 or third processing device 144. Third reading-in device 142 is configured to read in a third surrounding-area information item 141 with the aid of third detector 140. Third surrounding-area information item 141 represents an information item, which is receivable from the surroundings of vehicle 100 and is about object OBJ in the surroundings of vehicle 100. In addition, third reading-in device 142 is configured to pass on read-in, surrounding-area information item 141 to third execution device 144 or to prepare it for output. Third execution device 144 is configured to carry out processing of third surrounding-area information item 141 with the aid of third detector 140, in order to provide third sensor data 145. According to the exemplary embodiment represented here, third detector 140 is assigned a third emitting device 146, if third detector 140 has, for example, a detection principle based on radar. Third emitting device 146 is configured to emit a third sensing signal 147 into the surroundings of vehicle 100 with the aid of third detector 140. In response to third sensing signal 147, third surrounding-area information item 141 is receivable from the surroundings of vehicle 100, that is, from object OBJ. Third sensing signal 147 is, for example, a radio signal, in particular, a radar signal. Thus, third surrounding-area information item 141 is a reflected radar signal.

Device 160 includes reading-in devices 122, 132, 142, execution devices 124, 134, 144, and a fusion device 152. According to the exemplary embodiment represented here, device 160 further includes emitting devices 126, 136, 146. According to the exemplary embodiment represented here, device 160 additionally includes a determination device 154. According to one exemplary embodiment, reading-in devices 122, 132, 142, execution devices 124, 134, 144, and/or emitting devices 126, 136, 146 are manufactured as parts of detectors 120, 130, 140, respectively. According to the exemplary embodiment represented here, fusion device 152 and/or determination device 154 is/are constructed as parts of data management device 150.

Fusion device 152 is configured to merge first sensor data 125 and second sensor data 135, or first sensor data 125, second sensor data 135 and third sensor data 145, using a time-difference information item 153, in order to provide a measuring signal 155. In other words, fusion device 152 is configured to carry out sensor data fusion of first sensor data 125 and/or of second sensor data 135 and/or of third sensor data 145. Measuring signal 155 represents monitored surroundings of vehicle 100 and/or a detected object in the surroundings of vehicle 100. Fusion device 152 is configured to pass on measuring signal 155 to assistance system 105 and/or to prepare it for output. Time-difference information item 153 represents a time difference between a first latency time, which is needed by first detector 120 for the processing, up to the provision of first sensor data 125, and a second latency time, which is needed by second detector 130 for the processing, up to the provision of second sensor data 135, and/or a third latency time, which is needed by third detector 140 for the processing, up to the provision of third sensor data 145. According to the exemplary embodiment represented here, determination device 154 is configured to ascertain time-difference information item 153, in particular, to ascertain it continuously. For this, determination device 154 is configured to combine signal propagation times, times for physical-to-electrical conversion, and times for signal processing to obtain the first latency time regarding first detector 120, to obtain the second latency time regarding second detector 130, and to obtain the third latency time regarding third detector 140. Furthermore, determination device 154 is configured to pass on ascertained time-difference information item 153 to fusion device 152 and/or to prepare it for output.

According to one exemplary embodiment, fusion device 152 is configured to scale first sensor data 125 and/or second sensor data 135 and/or third sensor data 145, using time-difference information item 153. In addition, or alternatively, fusion device 152 is configured to synchronize first sensor data 125 and/or second sensor data 135 and/or third sensor data 145, in particular, with respect to each other and/or relative to a system time of sensor system 110, using time-difference information item 153 and a model for sensor data fusion. Fusion device 152 is configured to use a neural network, a classification method, a stochastic method, a Kalman filter, fuzzy logic and/or logical operations in the sensor data fusion.

According to one exemplary embodiment, using the sensor data 125, 135, 145 to be merged, determination device 154 is configured to ascertain time-difference information item 153 for the sensor data 125, 135, 145 to be merged by fusion device 152. According to a further exemplary embodiment, determination device 154 is configured to ascertain time-difference information item 153 for the sensor data 125, 135, 145 to be emerged by fusion device 152, using temporally previous sensor data 125, 135, 145, for example, using sensor data 125, 135, 145, which were provided in a predetermined time window prior to the provision of the sensor data 125, 135, 145 to be merged currently by fusion device 152. According to a further exemplary embodiment, determination device 154 is configured to ascertain time-difference information item 153, using sensor data 125, 135, 145 provided during a calibration phase of device 160.

Figure 2:
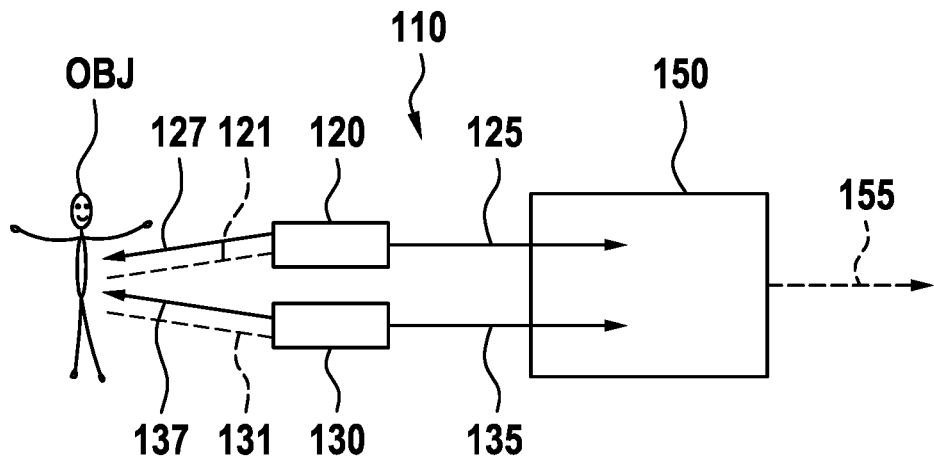
FIG. 2 shows a schematic representation of a sensor system according to an exemplary embodiment.

FIG. 2 shows a schematic representation of a sensor system 110 according to an exemplary embodiment. Sensor system 110 corresponds to, or is similar to, sensor system 110 from FIG. 1. In FIG. 2, a first detector 120, a second detector 130 and a data management device 150 of sensor system 110 are shown. In FIG. 2, an object OBJ is also put in the surroundings of a vehicle. In addition, a first surrounding-area information item 121, a first sensing signal 127, a second surrounding-area information item 131, a second sensing signal 137, first sensor data 125, second sensor data 135, and a measuring signal 155 are drawn into FIG. 2.

First detector 120 has lidar as a detection principle. Second detector 130 has radar as a detection principle. Data management device 150 is constructed as a so-called deadline monitor. First measurement data 125 are provided with a first latency time $t_{Lidar}$. Second measurement data 135 are provided with a second latency time $t_{Lidar}$ delta$_{Radar}$=$t_{real}$. Data management device 150 is configured to check a signal integrity, a temporal synchronism and a sequence, as well as to add data regarding position, trajectory, environmental conditions and the like. In addition, data management device 150 is configured to provide a real-time information item with measuring signal 155.

In other words, an example of a deadline monitor as a data management device 150 in the case of diverse object detection and geometric measurement by radar and lidar is shown in FIG. 2.

Figure 3:
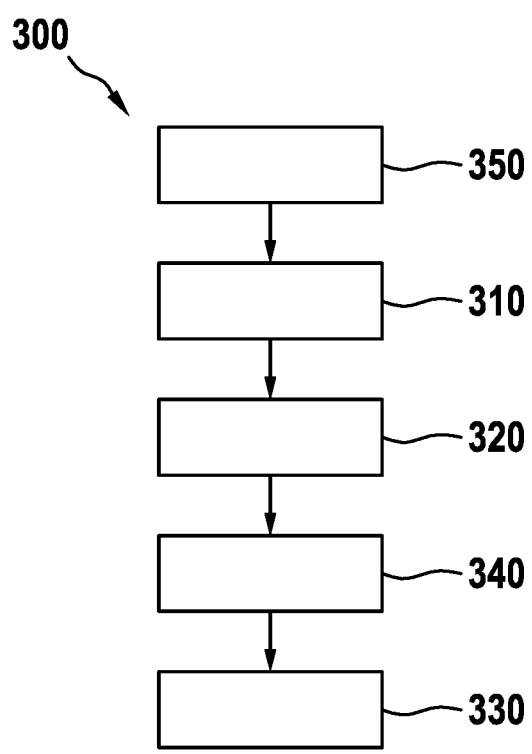
FIG. 3 shows a flow chart of a method for monitoring a surrounding area according to an exemplary embodiment.

FIG. 3 shows a flow chart of a method 300 for monitoring a surrounding area according to an exemplary embodiment. Method 300 may be implemented, in order to monitor the surroundings for a vehicle. In this context, method 300 for monitoring the surroundings in conjunction with, and/or using the sensor system from FIG. 1 or FIG. 2 or a similar sensor system, is implementable. In particular, method 300 for monitoring the surroundings in conjunction with, and/or using the device from FIG. 1 or FIG. 2 or a similar device, is implementable.

In the method 300 for monitoring surroundings, in a reading-in step 310, a first surrounding-area information item is read in with the aid of a first detector, and a second surrounding-area information item is read in with the aid of a second detector. In this context, the first surrounding-area information item and the second surrounding-area information item represent an information item, which is receivable from the surroundings of the vehicle and is about at least one object in the surroundings of the vehicle.

Subsequently, in an execution step 320, processing of the first surrounding-area information item is carried out with the aid of the first detector, in order to provide first sensor data, and processing of the second surrounding-area information item is carried out with the aid of the second detector, in order to provide second sensor data.

Subsequently, in turn, in a fusion step 330, the first sensor data and the second sensor data are merged, using a time-difference information item, in order to provide a measuring signal. In this connection, the time-difference information item represents a time difference between a first latency time, which is needed by the first detector for the processing, up to the provision of the first sensor data, and a second latency time, which is needed by the second detector for the processing, up to the provision of the second sensor data. The measuring signal represents monitored surroundings of the vehicle. For example, the measuring signal is provided for output to at least one assistance system or other vehicle system of the vehicle.

According to one exemplary embodiment, method 300 for monitoring surroundings also includes a step of ascertaining the time-difference information item for use in fusion step 330. In this connection, in ascertaining step 340, signal propagation times, times for physical-to-electrical conversion, and times for signal processing are combined to obtain the first latency time with regard to the first detector, and signal propagation times, times for physical-to-electrical conversion, and times for signal processing are combined to obtain the second latency time with regard to the second detector. Ascertaining step 340 may now be executed continuously or repeatedly, in particular, while other steps of method 300 are executed.

According to one exemplary embodiment, method 300 for monitoring the surroundings includes a step 350 of emitting a first sensing signal with the aid of the first detector and/or emitting a second sensing signal with the aid of the second detector, into the surroundings of the vehicle. In response to the first sensing signal, the first surrounding-area information item is receivable from the surroundings of the vehicle. In response to the second sensing signal, the second surrounding-area information item is receivable from the surroundings of the vehicle. Emitting step 350 may be executed prior to reading-in step 310.

Figure 4:
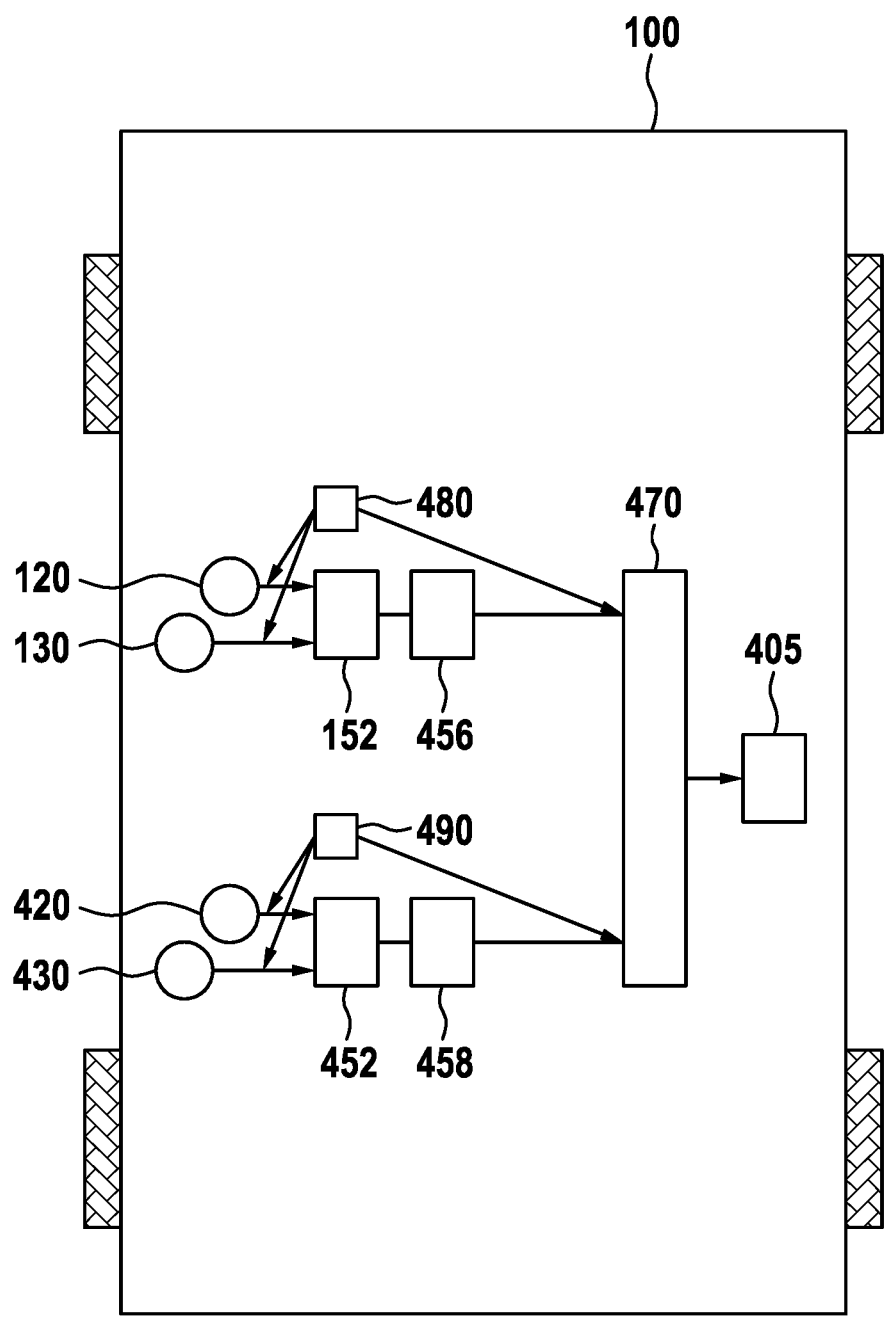
FIG. 4 shows a schematic representation of a vehicle having a sensor system according to an exemplary embodiment.

FIG. 4 shows a schematic representation of a vehicle 100 having a sensor system according to an exemplary embodiment. The sensor system, which is not explicitly denoted in FIG. 4, corresponds to, or is similar to the sensor system from FIG. 1 or FIG. 2.

In this connection, the sensor system includes first detector 120, second detector 130, as well as a further first detector 420 and a further second detector 430. Sensor data from first detector 120 and second detector 130 are merged with the aid of fusion device 152 of the sensor system. An algorithm device 456 is connected in outgoing circuit to fusion device 152. Sensor data from further, first detector 420 and further, second detector 430 are merged with the aid of a further fusion device 452 of the sensor system. A further algorithm device 458 is connected in outgoing circuit to further fusion device 452.

Algorithm device 456 and further algorithm device 458 are configured to evaluate the respective sensor data. A common channel selection device 470 or a so-called gatekeeper 470 is connected in outgoing circuit to algorithm device 456 and further algorithm device 458. A controlling element 405 or actuator 405 is, in turn, connected in outgoing circuit to channel selection device 470. Actuator 405 is assigned to a vehicle system of vehicle 100 and is also controllable, for example, via an assistance system of vehicle 100.

A safety monitoring device 480 or a so-called safety monitor 480 is configured to monitor the sensor data prior to the sensor data fusion by fusion device 152. In addition, safety monitoring device 480 is configured to influence a signal transmitted between algorithm device 456 and channel selection device 470 as a function of a result of implemented safety monitoring. A further safety monitoring device 490 or a further, so-called safety monitor 490 is configured to monitor the sensor data prior to the sensor data fusion by further fusion device 152. In addition, further safety monitoring device 490 is configured to influence a signal transmitted between further algorithm device 458 and channel selection device 470 as a function of a result of implemented safety monitoring.

For example, based on a surrounding-area information item initially available, it may be assumed that a child is suddenly running in front of vehicle 100. If it is then discerned by the sensor system, and/or due to the evaluation of a surrounding-area information item available later, that it was not a child, but swirled-up dust or the like, then, for example, a braking command may simply not be put through to actuator 405. Then, gatekeeper 470 lets only the correct information, that is, the correct measuring signal, through. This is advantageous for sensor systems, in particular, redundant systems.

In the following, exemplary embodiments are explained once more in a condensed manner and/or briefly introduced with reference to the figures described above.

In sensor system 110, one object is to combine physical data delay times and times for physical-to-electric conversion and to ascertain a system-dependent time constant in the form of latency times and time-difference information item 153, as well. If particular factors result in significant delay-time variances, then these are acquired, for example, for the delay time, so that a pair of values from the factors is available at any time. In addition, the times for signal conversion, error correction and error control are measured. In particular, in reflection-based detectors, that is, systems such as laser and radar, portions of the emitted beams, that is, sensing signals 127, 137, 147, and a time, are measured, which are then converted to the target variable, for example, distance and angle, or the like. In the case of the various sensors, the determination of the target variable is carried out in different ways, depending on the measuring principle, and mostly takes differing amounts of time within the relevant tolerances, which allows such a chain in the form of a flow of data to vary.

Since the chain made up of a physical effect to be measured, e.g., movement of an object OBJ, signal propagation time, physical-to-electrical conversion, measuring signal conditioning and provision of the sensor signal to be transmitted and/or the sensor data 125, 135, 140 to be transmitted for a particular detector 120, 130, 140, generally proceeds temporally in a fixed time window, it is provided, in this case, that a time stamp first be attached to the specific sensor signal upon the provision of data. In general, a sensor-specific, conservative time window is generated by the different tolerances, which may add up and also subtract. As an alternative, a time information item from the infrastructure may be used. For example, a camera may detect a change from red to green; the change being able to be transmitted wirelessly to vehicle 100 as a time reference. Since a traffic light is geometrically stationary, this may be used advantageously for calibrating sensor system 110.

In general, with the aid of the execution devices 124, 134, 144, error treatments, diagnostics and error correction mechanisms are still necessary for signal conditioning, in order that sensor data 125, 135, 140 in the form of a sufficiently valid signal may be provided for communication. In general, this time also lies in a time interval typical of the sensor principle. Thus, for the communication, a typical age of the measurement information may be provided, which is in direct relation to the actual physical effect. In general, another so-called message counter is added, in order that a signal order and lost messages, as well, may be identified. If detector 120, 130, 140 is also synchronized temporally after an initialization, in order that the system time and message sequences are synchronized, then each valid sensor signal, including the time, may be related to the real, physical effect to be measured.

Redundant measuring elements are often used as detectors 120, 130, 140, such as, e.g., in the case of a stereo camera, or even redundant sensors; or in the case of reflection-based systems, echoes are used to obtain redundant and/or plausible data. In this case, the issue arises, that the signals also vary in tolerance, even when the same measuring principle is often used, until they are relayed via the communication. Using the information regarding the general time sequence up to the signal provision, a time window may be generated, which waits for the first measured value. Based on the first measured value, an expected position may be defined at the second redundant, measured value. If this meets the expectation, the signal or sensor data 125, 135, 140 may be transferred as established information to the communication, including the time stamp. Diagnostics, signal quality or the physical condition of the signal may also be assigned to the time stamp. In this connection, in execution step 320, that is, with the aid of execution devices 124, 134, 144, sensor data 125, 135, 140 are provided with respective time information items, and in fusion step 330, that is, with the aid of fusion device 152, they are merged, using the time information items.

Since a time stamp is generally quite long, sensor data 125, 135, 140 may also be synchronized to a message counter or ring counter having a more simple data format. Thus, the message counter constitutes the time equivalent. Since, in general, a time window for data transmission may often be larger than a frequency of incoming sensor data, redundancy comparators may average a variance in the signal propagation time logically, and consequently, tolerance deviations per redundant signal are reduced. By compensating for signal propagation times typical of a sensor, instances of sensor data fusion based on diversely redundant sensors in accordance with exemplary embodiments may be synchronized temporally accurately to the actual physical effect. Since a traveling vehicle also moves itself (driving, steering, pitching, vibrations), many factors have an influence on sensor data 125, 135, 140 and the relationship to reality. If a so-called deadline monitor, which is preconfigured to all relevant data having a particular expectation in the defined time interval, is used for acquiring the real information and the relevant environmental and surrounding-area information items, synchronized deterministic data may be generated.

For data security, but also for reasons of data integrity, individual information items may be encrypted or marked or the like. Therefore, incorrect or corrupted data may be rejected by the deadline monitor or, in the case of highly available systems, may be denoted data-technology-specifically by signal qualifiers as having less integrity.

This then makes sense, in particular, if unsharp logic, such as so-called fuzzy logic or neural networks, which have different algorithm running times, are used, or if a plurality of sources may be used for checking plausibility. Different delay times, which, in a communication of a correctness information item, may be properly compensated for and communicated more rapidly than an actual useful information item, are also present in the case of neural networks. Consequently, a signal availability may be increased. Thus, in the step 320 of carrying out the processing, that is, with the aid of execution devices 124, 134, 144, sensor data 125, 135, 140 are provided with an integrity information item, which is checked in fusion step 330, that is, with the aid of fusion device 152.

The surrounding-area information item and/or the first information item initially available or available from a first source may be used, in order to prepare for degradation in sensor system 110 and then to conduct an active or more intensive vehicle intervention in response to an information item confirmed by a surrounding-area information item available later or available from a second source. For example, a black-and-white image of a lidar sensor may result in a reduction of the speed of vehicle 100; a surrounding-area information item from a radar sensor being able to result in deceleration, if the surrounding-area information item of a lidar sensor is confirmed. Alternatively, an object OBJ or obstacle may be identified as not worthy of braking for, and vehicle 100 may resume the original speed.

If an exemplary embodiment includes an "and/or" conjunction between a first feature and a second feature, then this is to be read such that, according to one specific embodiment, the exemplary embodiment includes both the first feature and the second feature, and according to another specific embodiment, the exemplary embodiment includes either only the first feature or only the second feature.

What is claimed is:

1. A method for monitoring surroundings of a vehicle, the method comprising:
   reading in a first surrounding-area information item with a first detector and a second surrounding-area information item with a second detector, wherein the first surrounding-area information item and the second surrounding-area information item represent an information item, which is receivable from the surroundings of the vehicle and is about at least one object in the surroundings;
   processing the first surrounding-area information item with the first detector, to provide first sensor data, and processing of the second surrounding-area information item with the second detector, to provide second sensor data; and
   merging the first sensor data and the second sensor data, using a time-difference information item, to provide a measuring signal; the time-difference information item representing a time difference between a first latency time, which is used by the first detector for the processing, up to the provision of the first sensor data, and a second latency time, which is used by the second detector for the processing, up to the provision of the second sensor data, wherein the measuring signal represent monitored surroundings of the vehicle.

2. The method of claim 1, further comprising:
   ascertaining the time difference information item, wherein in the ascertaining, signal propagation times, times for physical-to-electrical conversion, and times for signal processing are combined to obtain the first latency time with regard to the first detector and combined to obtain the second latency time with regard to the second detector.

3. The method of claim 1, wherein in the fusion, (i) at least one of the first sensor data and the second sensor data are scaled, using the time-difference information item, and/or (ii) the first sensor data and the second sensor data are synchronized, using the time-difference information item and a model for sensor data fusion.

4. The method of claim 1, wherein in the fusion, at least one of a neural network, a classification method, a stochastic method, a Kalman filter, fuzzy logic and/or logic operations are used.

5. The method of claim 1, wherein in the processing, the first sensor data are provided with a first time information item, and the second sensor data are provided with a second time information item, and wherein in the fusion, the first sensor data and the second sensor data are merged, using the first time information item and the second time information item.

6. The method of claim 1, further comprising:
   emitting a first sensing signal with the first detector and/or emitting a second sensing signal with the second detector, into the surroundings of the vehicle, wherein the first surrounding-area information item and/or the second surrounding-area information item are receivable from the surrounding area of the vehicle in response to the first sensing signal and/or in response to the second sensing signal.

7. The method of claim 1, wherein in the processing, the first sensor data and the second sensor data are provided with an integrity information item, and wherein the integrity information item is checked in the fusion task.

8. The method of claim 1, wherein in the reading-in, a further surrounding-area information item is read in with a further detector, wherein the further surrounding-area information item represents an information item, which is receivable from the surroundings of the vehicle and is about at least one object in the surroundings, and wherein the processing of the further surrounding-area information item is carried out with the further detector, to provide further sensor data, and wherein in the fusion, the further sensor data are merged with the first sensor data and/or with the second sensor data, using the time-difference information item, and wherein the time-difference information item represents a time difference between the first latency time, the second latency time and/or a further latency time, which is needed by the further detector for the processing, up to the provision of the further sensor data.

9. The method of claim 1, further comprising:
   checking a consistency of the first surrounding-area information item and the second surrounding-area information item;
   passing on the measuring signal or the first surrounding-area information item, if there is consistency between the first surrounding-area information item and the second surrounding-area information item; and
   blocking the measuring signal or the first surrounding-area information item, if there is no consistency between the first surrounding-area information item and the second surrounding-area information item.

10. An apparatus for monitoring surroundings of a vehicle, comprising:
    a device configured to perform the following:
       reading in a first surrounding-area information item with a first detector and a second surrounding-area information item with a second detector, wherein the first surrounding-area information item and the second surrounding-area information item represent an information item, which is receivable from the surroundings of the vehicle and is about at least one object in the surroundings;
       processing the first surrounding-area information item with the first detector, to provide first sensor data, and processing of the second surrounding-area information item with the second detector, to provide second sensor data; and
       merging the first sensor data and the second sensor data, using a time-difference information item, to provide a measuring signal; the time-difference information item representing a time difference between a first latency time, which is used by the first detector for the processing, up to the provision of the first sensor data, and a second latency time, which is used by the second detector for the processing, up to the provision of the second sensor data, wherein the measuring signal represent monitored surroundings of the vehicle.

11. A sensor system for monitoring surroundings of a vehicle, comprising:
    a first detector;
    a second detector; and
    a device configured to perform the following:
       reading in a first surrounding-area information item with a first detector and a second surrounding-area information item with a second detector, wherein the first surrounding-area information item and the second surrounding-area information item represent an information item, which is receivable from the surroundings of the vehicle and is about at least one object in the surroundings;

processing the first surrounding-area information item with the first detector, to provide first sensor data, and processing of the second surrounding-area information item with the second detector, to provide second sensor data; and merging the first sensor data and the second sensor data, using a time-difference information item, to provide a measuring signal; the time-difference information item representing a time difference between a first latency time, which is used by the first detector for the processing, up to the provision of the first sensor data, and a second latency time, which is used by the second detector for the processing, up to the provision of the second sensor data, wherein the measuring signal represent monitored surroundings of the vehicle.

12. The sensor system of claim 11, wherein the first detector and the second detector have an identical or a different detection principle.

13. The sensor system of claim 11, wherein the first detector has a detection principle based on lidar; and the second detector has a detection principle based on radar or is constructed as a vehicle camera.

14. The sensor system of claim 11, further comprising:
a further detector connected to the device so as to be able to transmit a signal.

15. A non-transitory computer readable medium having a computer program, which is executable by a processor, comprising:

a program code arrangement having program code for monitoring surroundings of a vehicle, by performing the following:

reading in a first surrounding-area information item with a first detector and a second surrounding-area information item with a second detector, wherein the first surrounding-area information item and the second surrounding-area information item represent an information item, which is receivable from the surroundings of the vehicle and is about at least one object in the surroundings;

processing the first surrounding-area information item with the first detector, to provide first sensor data, and processing of the second surrounding-area information item with the second detector, to provide second sensor data; and merging the first sensor data and the second sensor data, using a time-difference information item, to provide a measuring signal; the time-difference information item representing a time difference between a first latency time, which is used by the first detector for the processing, up to the provision of the first sensor data, and a second latency time, which is used by the second detector for the processing, up to the provision of the second sensor data, wherein the measuring signal represent monitored surroundings of the vehicle.

* * * * *